United States Patent
Gubernator et al.

(10) Patent No.: US 6,436,351 B1
(45) Date of Patent: Aug. 20, 2002

(54) MICROTITRE CHEMICAL REACTION SYSTEM

(75) Inventors: Klaus M. Gubernator, San Diego; Joe Cohen, Del Mar; Robert A. Zambias, San Diego, all of CA (US)

(73) Assignee: Deltagen Research Laboratories, L.L.C., San Diego, CA (US)

( * ) Notice: Subject to any disclaimer, the term of this patent is extended or adjusted under 35 U.S.C. 154(b) by 0 days.

(21) Appl. No.: 09/116,435

(22) Filed: Jul. 15, 1998

(51) Int. Cl.[7] .................................................. B01L 3/00
(52) U.S. Cl. ..................... 422/102; 422/101; 422/104; 435/288.3; 435/288.4; 210/257.2; 210/258; 210/321.75; 210/416.1
(58) Field of Search .................... 422/101, 102, 422/104, 942, 943; 435/288.3, 288.4, 305.1–305.3; 210/257.2, 255, 321.75, 341, 416.1, 455

(56) References Cited

U.S. PATENT DOCUMENTS

| | | |
|---|---|---|
| 86,670 A | 2/1869 | Hickman |
| 2,627,619 A | 2/1953 | Gagen .................... 15/121.3 |
| 4,024,857 A | 5/1977 | Bleecher et al. ............ 128/2 F |
| 4,070,249 A | 1/1978 | Janin et al. ................. 195/127 |
| 4,073,693 A | 2/1978 | Janin .................. 195/103.5 K |
| 4,278,437 A | 7/1981 | Haggar ..................... 23/230 B |
| 4,286,637 A | 9/1981 | Wilson ....................... 141/374 |
| 4,599,314 A | 7/1986 | Shami ........................ 435/287 |
| 4,895,706 A | 1/1990 | Root et al. .................. 422/102 |
| 4,948,564 A | 8/1990 | Root et al. .................. 422/101 |
| 5,047,215 A | 9/1991 | Manns ........................ 422/101 |
| 5,084,246 A | 1/1992 | Lyman et al. ............... 422/101 |
| 5,096,672 A * | 3/1992 | Tervamaki et al. ......... 422/101 |
| 5,108,704 A | 4/1992 | Bowers et al. ............... 422/70 |
| 5,110,556 A | 5/1992 | Lyman et al. ............... 422/101 |
| 5,112,574 A | 5/1992 | Horton ....................... 422/102 |
| 5,141,719 A * | 8/1992 | Fernwood et al. .......... 422/101 |
| 5,188,733 A * | 2/1993 | Wang et al. ............ 210/321.84 |
| 5,244,635 A | 9/1993 | Rabson et al. ................ 422/72 |

(List continued on next page.)

FOREIGN PATENT DOCUMENTS

| | | |
|---|---|---|
| EP | 645 187 A2 | 3/1995 |
| EP | 797 088 A1 | 9/1997 |
| JP | 60-007340 A | 1/1985 |
| WO | WO 95/22406 | 8/1995 |
| WO | WO 97/15394 | 5/1997 |

OTHER PUBLICATIONS

T. Astle, "Setting a New Industry Standard that Accomodates Robotics", *Laboratory Automation News*, vol. 1, No. 2, Mar. 1996, pp. 24–26.
R.A. Zeineh, "Spillproof, Disposable Test Tube", *American Laboratory*, vol. 8, No. 11, Nov. 1976, pp. 51–53.
"ORO–SYS II Solution Phase Synthesis 96–Position Glass Micro–Reactor", Product Literature.

*Primary Examiner*—Jill Warden
*Assistant Examiner*—Kathryn Bex
(74) *Attorney, Agent, or Firm*—Townsend and Townsend and Crew LLP

(57) ABSTRACT

A microtiter reaction system (15), comprising, a support rack (16) having an array of reaction wells (18) disposed therein, each reaction well (18) having an open top end (30) and a closed bottom end (32); a plurality of generally funnel shaped reactor caps (20) with each of reactor cap (20) being received into open top end (30) of each reaction well (18); a porous gas-permeable layer (22) positioned over support rack (16), gas-permeable layer(22) having an array of holes (23) therein with each hole (23) being positioned over open top end (30) of each of the plurality of reaction wells (18); gasket (24) positioned over porous gas-permeable layer (22); and a top cover (26) positioned over gasket (22).

23 Claims, 14 Drawing Sheets

U.S. PATENT DOCUMENTS

| | | | |
|---|---|---|---|
| 5,324,483 A | 6/1994 | Cody et al. | 422/131 |
| 5,326,533 A | 7/1994 | Lee et al. | 422/101 |
| 5,338,666 A | 8/1994 | Monthony et al. | 435/34 |
| 5,342,581 A | 8/1994 | Sanadi | 422/101 |
| 5,346,672 A * | 9/1994 | Stapleton et al. | 422/102 |
| 5,368,586 A * | 11/1994 | Van Der Heiden et al. | 604/403 |
| 5,460,783 A | 10/1995 | Hautea et al. | 422/104 |
| 5,514,343 A | 5/1996 | Verwholt et al. | 422/104 |
| 5,516,490 A | 5/1996 | Sanadi | 422/101 |
| 5,565,173 A | 10/1996 | DeWitt et al. | 422/131 |
| 5,567,391 A | 10/1996 | DeWitt et al. | 422/131 |
| 5,582,801 A | 12/1996 | DeWitt et al. | 422/131 |
| 5,589,350 A | 12/1996 | Bochner | 435/29 |
| 5,593,642 A | 1/1997 | DeWitt et al. | 422/131 |
| 5,604,130 A | 2/1997 | Warner et al. | 435/286.7 |
| 5,609,826 A | 3/1997 | Cargil et al. | 422/99 |
| 5,665,247 A | 9/1997 | Valus et al. | 210/767 |
| 5,702,672 A | 12/1997 | DeWitt et al. | 422/131 |
| 5,709,840 A | 1/1998 | Juranas | 422/99 |
| 5,711,917 A * | 1/1998 | Juranas et al. | 422/99 |
| 5,714,127 A | 2/1998 | DeWitt et al. | 422/131 |
| 5,716,584 A * | 2/1998 | Baker et al. | 422/131 |
| 5,741,463 A * | 4/1998 | Sanadi | 422/101 |
| 5,766,556 A | 6/1998 | DeWitt et al. | 422/131 |
| 5,780,294 A * | 7/1998 | Stevens et al. | 435/297.5 |
| 6,159,368 A * | 12/2000 | Moring et al. | 210/321.75 |

* cited by examiner

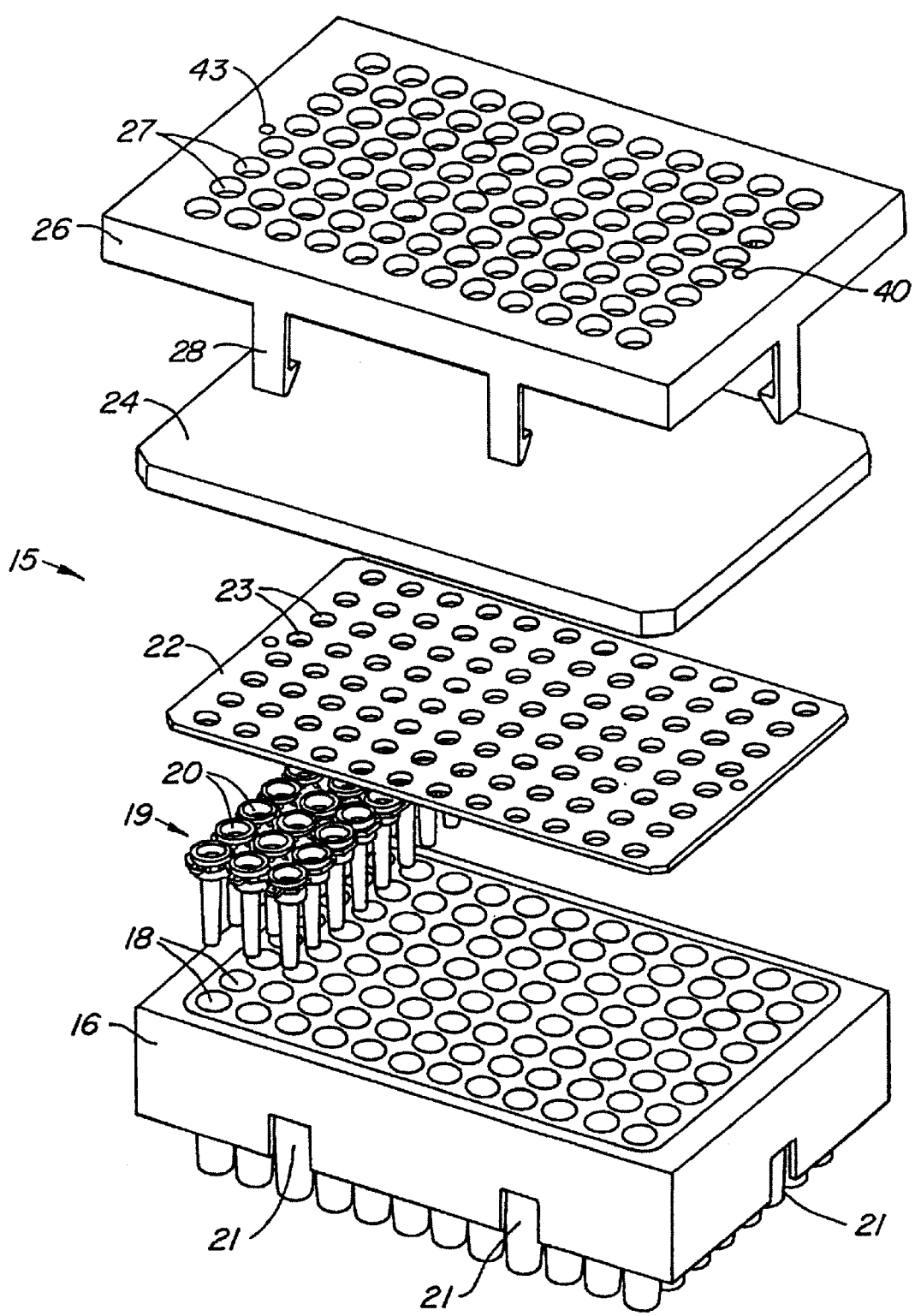
FIG. IA.

MICROTITRE CHEMICAL REACTION SYSTEM

TECHNICAL FIELD

The present invention relates to reaction wells and more particularly to devices incorporating arrays of microtitre reaction wells.

BACKGROUND OF THE INVENTION

Microtitre plates provide convenient handling systems for processing, shipping, and storing small liquid samples. Such devices are especially useful in high-throughput screening and combinatorial chemistry applications and are well suited for use with robotic automation systems which are adapted to selectively deliver various substances into different individual wells of the microtitre plate. As such, microtitre plates have proven especially useful in various biological, pharmacological, and related processes which analyze and/ or synthesize large numbers of small liquid samples.

Standard multi-well microtitre plates come in a range of sizes, with shallow well plates having well volumes on the order of 200 to 300 microliters and deep well plates typically having well volumes of 1.2 mL or 2.0 mL. A common example of a multi-well microtitre plate system is the standard 96-well microplate. Such microplates are typically fabricated from a variety of materials including polystyrene, polycarbonate, polypropylene, PTFE, glass, ceramics, and quartz.

Unfortunately, standard microtitre plates suffer from a number of limitations, particularly with regard to chemical synthesis. For example, spillage, leakage, evaporation loss, airborne contamination of well contents, and inter-well cross-contamination of liquid samples are some of the common deficiencies that limit the application of standard microtitre plate assemblies in high through-put synthesis systems.

Existing multi-well reaction arrays are large, bulky devices which can not be conveniently mounted to, and removably exchanged between, devices which handle standard microtitre plates such as centrifuges, orbital shakers, shelf dryers, analytical injectors and liquid-handling robots. In addition, another disadvantage of existing multi-well reaction arrays is that convenient temperature control of the reaction wells is quite limited. Presently, temperature control is typically accomplished by way of large, bulky heating and cooling blocks which can not conveniently be used on liquid-handling robots.

SUMMARY OF THE INVENTION

The present invention provides a reaction well array device in a microtitre plate format which is adapted to substantially eliminate cross-contamination, spillage, and evaporation from the individual reaction wells. Moreover, the present device is adapted to provide a sealed environment such that the contents in the interior of the reaction wells are not exposed to the external environment. An additional advantage of the present reaction well array device is that gas pressure can easily be equalized over the entire array of reaction wells. Another advantage of the present system is that gases can selectively be introduced and/or removed from the reaction environment without exposing the contents of the reaction wells to the external environment. Specifically, the present device is specifically adapted to selectively receive liquid samples introduced or removed by way of robotic or manually controlled injection needles, without violating the internal sealed reaction environment of the system.

The present invention also provides a base plate which can be attached for convenient mounting of the system on a variety of other devices which handle standard microtitre plate formats such as centrifuges, orbital shakers, shelf dryers, analytical injectors and liquid handling robots. In addition, the present invention also provides a small efficient temperature control system for adjusting and maintaining preferred temperatures in the reaction wells.

In one preferred embodiment, the present invention provides a microtitre reaction system having an array of reaction tubes or wells which are integrally formed into an underlying support rack. In an alternative preferred embodiment, the present invention provides an array of reaction wells which are each selectively removable from an underlying support rack. An advantage of this second embodiment is that each of the various reaction wells can be selectively removed and/or replaced in the support rack, as is desired. As such, the present microtitre device is readily adaptable for manual removal of individual reaction wells or for use with an automated robotic system for removing and replacing individual reaction wells.

A porous gas distribution plate is positioned over the array of reaction wells. In a preferred embodiment, the porous gas distribution plate has an array of holes passing therethrough with a single hole disposed over the open top end of each of the reaction wells. In a preferred embodiment, the porous gas distribution plate is formed of small polypropylene particles which are fused together with porous passages or channels remaining between the particles so as to permit gas diffusion through the plate. The porous gas diffusion plate operates to permit gas passage in a common area over the array of adjacent reaction wells.

A gasket and a top cover are positioned over the porous gas distribution plate such that a sealed reaction environment is provided for each of the various reaction wells in the array. A gas purge vent is preferably provided in the present device such that gases may be selectively introduced or removed from the reaction environment while liquid transfer out of any individual well or between any two adjacent wells is prevented.

The optional base plate can be attached to conveniently convert the support rack and reaction wells into a deep well microtitre plate configuration such that it can be mounted to a variety of different devices including, centrifuges, orbital shakers, shelf dryers, robotic liquid handlers and automated injectors for analytical and preparative chromatography and the like.

Moreover, the present invention may optionally include a small heating and cooling system which is attached thereto such that enhanced temperature control in the reaction environment is achieved.

Optionally, a generally funnel-shaped reactor cap is included and is received into the open top end of each reaction well, prior to the placement of the gas distribution plate thereover. An example of such generally funnel-shaped reactor caps can be found in U.S. patent application No. 08/953,441, assigned to Texperts, Inc., a Delaware Corporation. The advantages of such funnel-shaped reactor caps include their substantial inhibition of liquid passage out of each reaction well such that liquid spillage is substantially prevented for all orientations of the reaction well array. Such funnel-shaped reactor caps are typically held together in an array formation by way of an interlocking web. In such an array, the reactor caps can be easily fit into an array of reaction wells as a single unit.

BRIEF DESCRIPTION OF THE DRAWINGS

FIG. 1A is an exploded top pictorial view of the present microtitre reaction device;

DESCRIPTION OF THE PREFERRED EMBODIMENTS

Figure 1B:
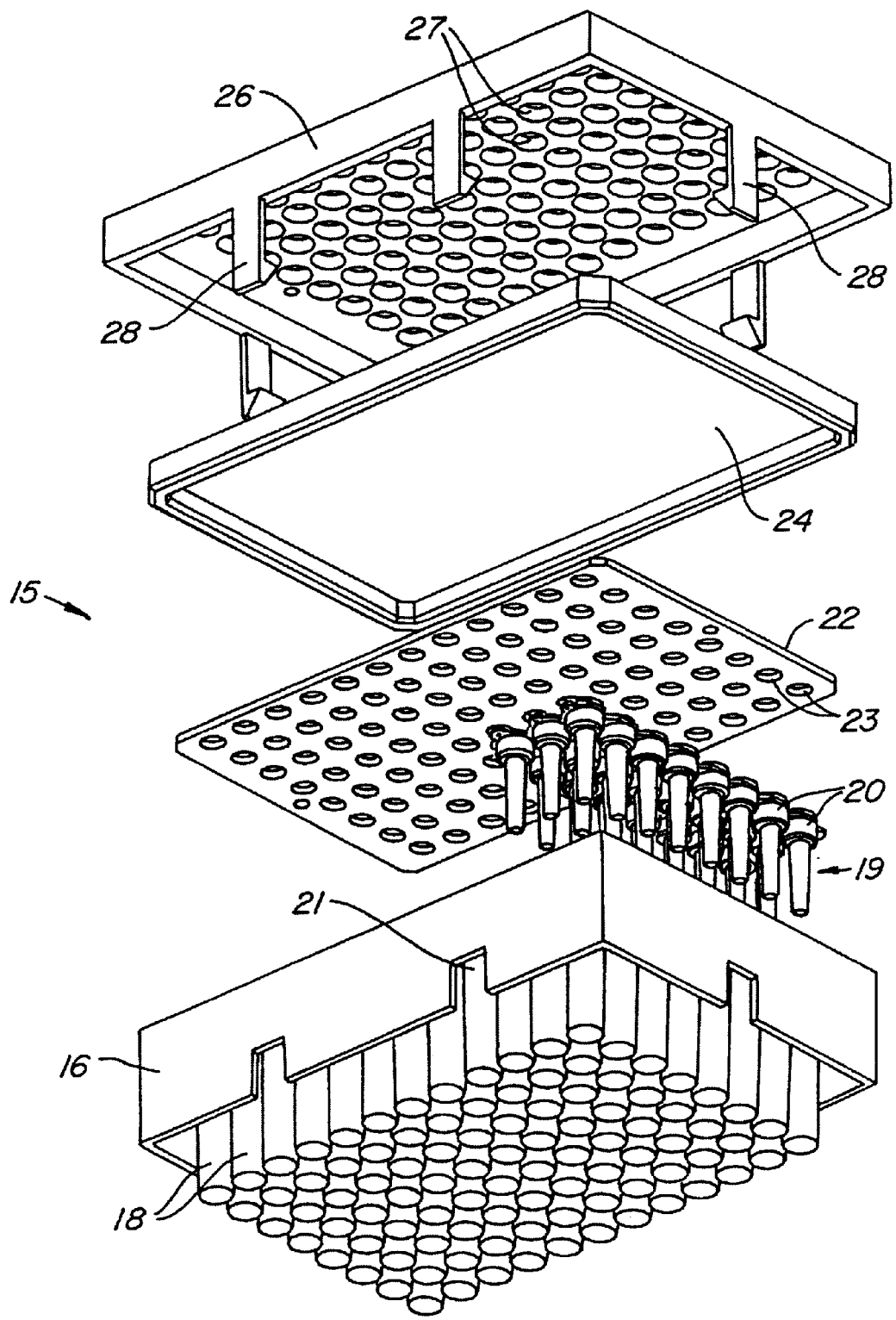
FIG. 1B is an exploded bottom pictorial view corresponding to FIG. 1A.
Figure 2:
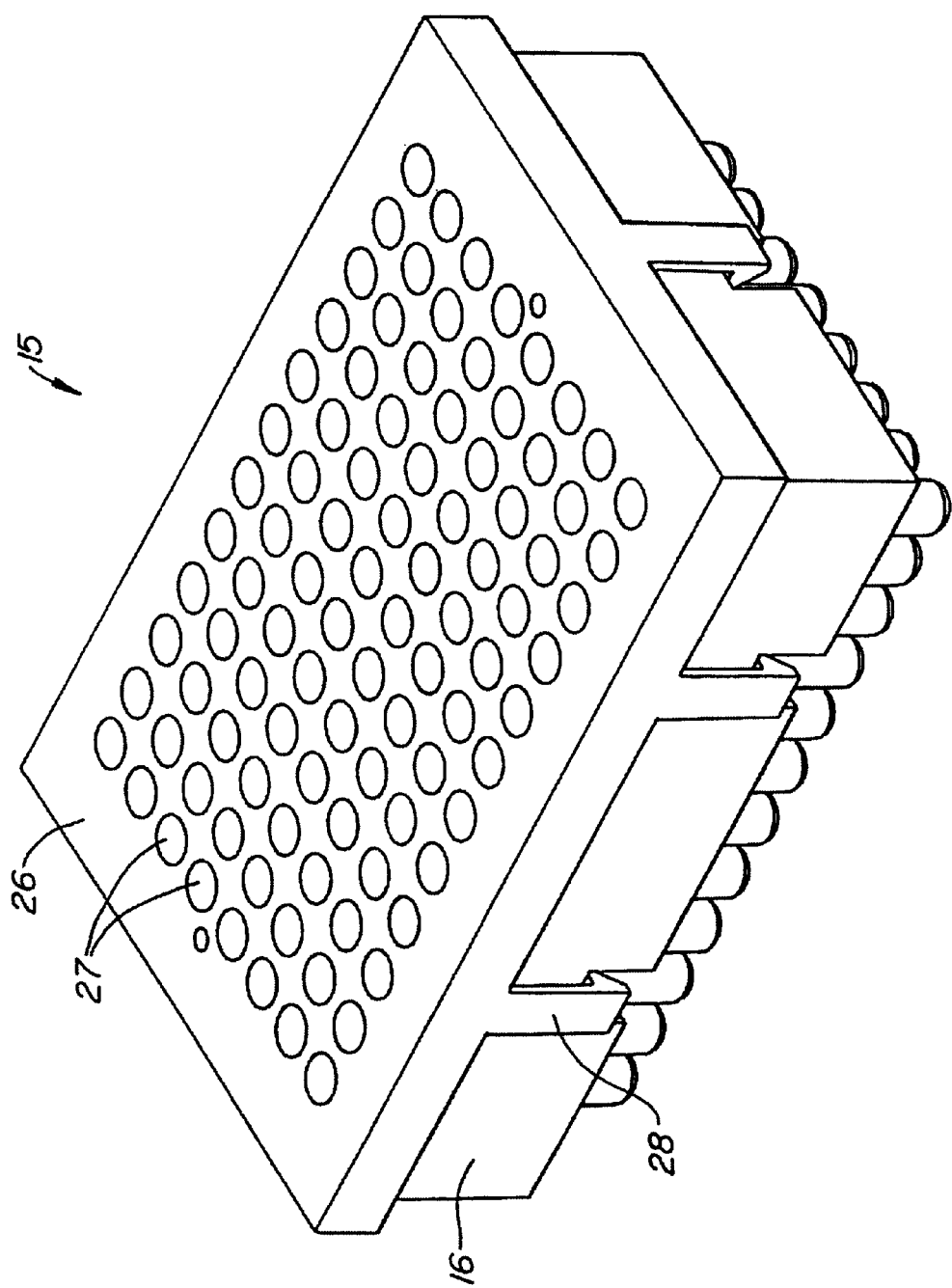
FIG. 2 is a top perspective view of the microtitre device of FIG. 1A in an assembled condition.
Figure 3A:
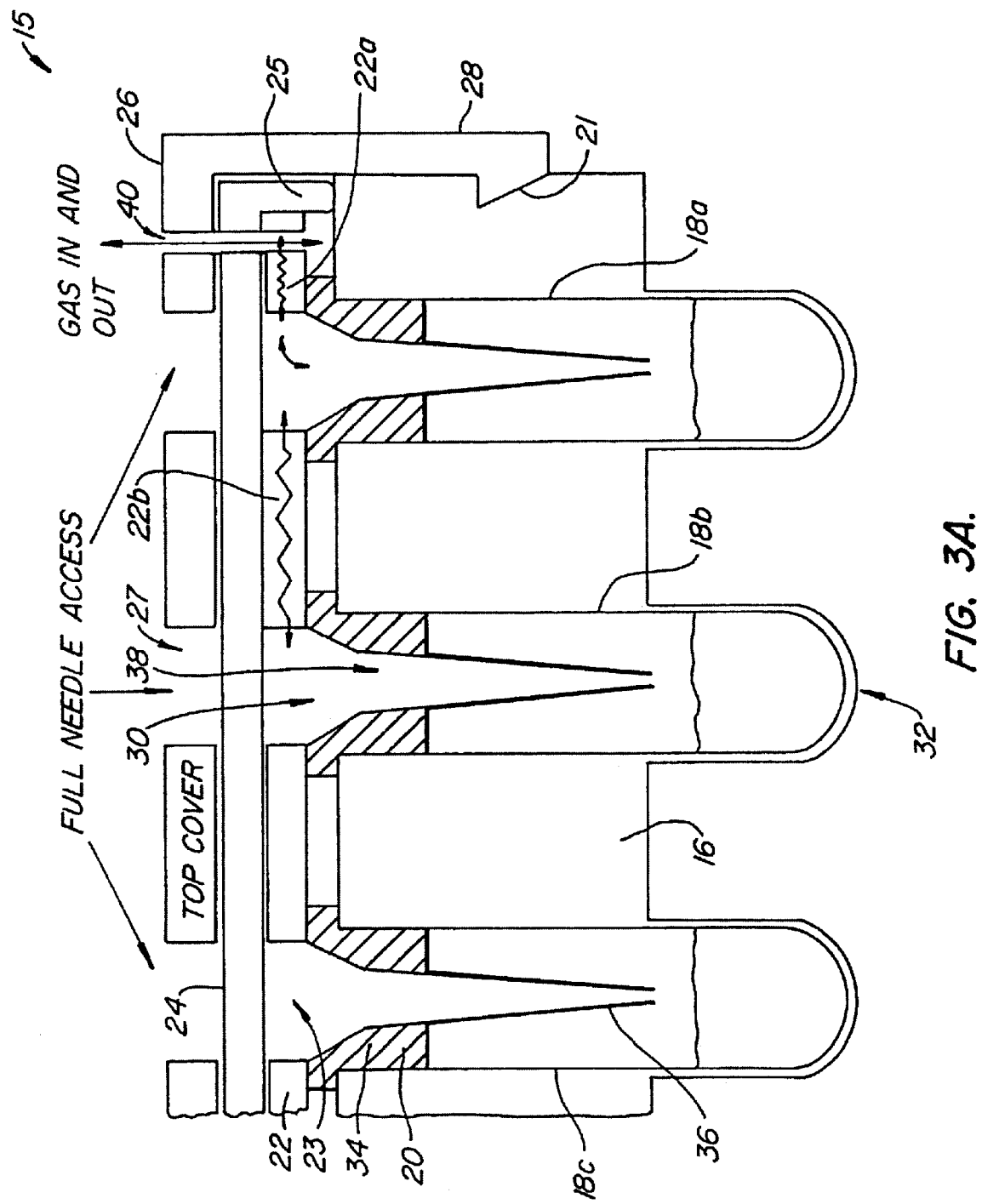
FIG. 3A is a partial side sectional elevation view of a portion of the microtitre device of FIG. 2, showing an array of reaction wells integrally formed into a support rack.
Figure 3B:
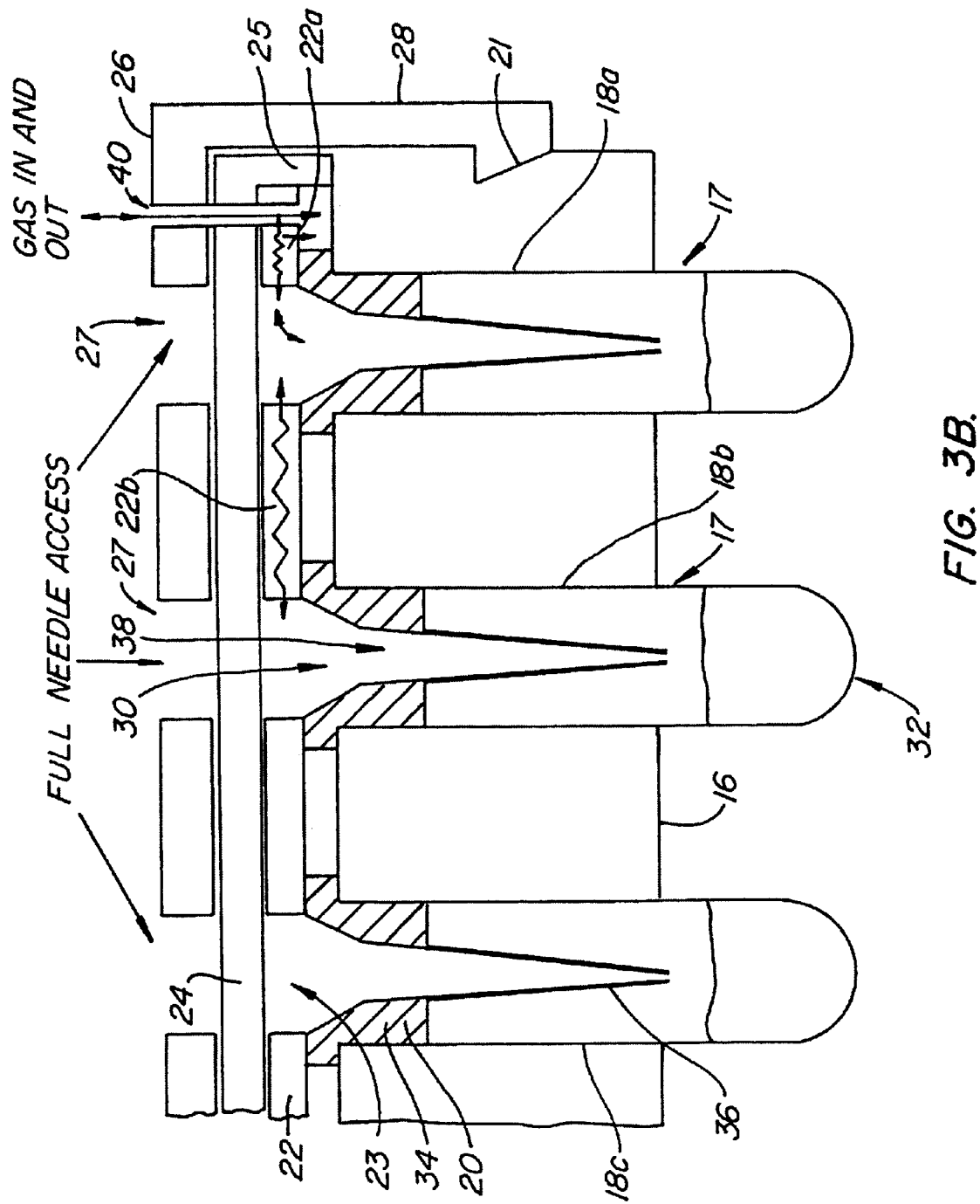
FIG. 3B is a view corresponding to FIG. 3A, but with an array of separately removable reaction wells received in passages passing through the support rack.

As is seen in FIGS. 1A, 1B and 2, the present invention provides a multi-well microtitre reaction system 15 comprising a support rack 16, having an array of reaction wells 18. Optionally, system 15 may include a reactor cap assembly 19 with an array of reactor caps 20 extending into wells 18. A porous gas distribution plate 22, having an array of holes 23 passing therethrough, is captured between support rack 16 and a gasket 24. (Alternatively, if optional assembly 19 is included, gas distribution plate 22 is captured between assembly 19 and gasket 24). System 15 further comprises a top cover 26, used to retain all of the system components together, having a plurality of holes 27 passing therethrough. Retaining clips 28, which are preferably formed integral with top cover 26, extend downwardly to matingly interlock with notches 21 in the side of support rack 16, thereby holding the system together, as is seen in FIGS. 2, 3A and 3B. The present design provides a sealed reaction environment for each of the reaction wells 18 and eliminates the problems of spillage, leakage, evaporation loss, airborne contamination of well contents, and inter-well cross-contamination of liquid samples as will be explained.

In a first preferred embodiment as seen in FIG. 3A, the array of reaction wells 18 is integrally formed together with support rack 16 as a single unit, preferably from a block of injection molded polypropylene.

In a second preferred embodiment, as seen in FIG. 3B, the array of reaction wells 18 comprises selectively removable reaction tubes which are each separately received in an array of passages 17 formed in support rack 16. In this second embodiment, each separately removable reaction well 18 operates to seal a separate passage 17, such that a sealed reaction environment above the array of reaction wells 18 is provided. In this embodiment, reaction tubes comprising wells 18 are preferably formed from glass or polypropylene and support rack 16 is preferably formed from polypropylene.

Optional reactor caps 20 are preferably formed from polypropylene and operate to substantially eliminate spillage, leakage, evaporation loss and inter-well cross-contamination among wells 18, as follows. As can be seen in FIGS. 3A to 9, each reactor cap 20 has an upper sealing plug portion 34 and a lower funnel cone portion 36. Sealing plug portion 34 is dimensioned to be slidably press fit into the open top end 30 of reaction well 18. Liquids received through a central vent 38 in each reaction cap 20 will pool at the closed bottom end 32 of each reaction well 18 as shown. Funnel cone portion 36 is dimensioned to extend inwardly into reaction well 18 and preferably terminates at a generally centrally located position in reaction well 18. Such generally funnel-shaped reactor caps, which are inserted into the top open end of a reaction well and terminate at a generally centrally located position in the reaction well, are known to exist.

As can be seen, gas distribution plate 22 preferably has holes 23 passing therethrough. Holes 23 are disposed in an array formation (best seen in FIGS. 1A and 1B) such that a single hole 23 is positioned over the open top end of each reaction well 18 (best seen in FIGS. 3A and 3B). Holes 23 permit injection needle access through gasket 24 and into various reaction wells 18, as will be further explained. In alternative embodiments, holes 23 are not initially prefabricated in gas distribution plate 22, but are instead later formed by the penetration of injection needles through gasket 24 and gas distribution plate 22 when delivering liquid samples into reaction wells 18. Gas distribution plate 22 is preferably formed from a gas-permeable sheet which is generally resistant to liquid permeation. Such a sheet can be provided from granulated polypropylene wherein small particles of polypropylene are bonded together forming porous passages or channels remaining between the particles so as to permit gas diffusion therethrough. An example of such a material is made by Porex Technologies of Fairborn, Ga., and sold under the tradename "Porex". Plate 22 is adapted to permit gas distribution over the entire array of reaction wells 18 by permitting gas distribution between any two adjacent reaction wells 18 as will be more fully explained herein.

Gasket 24 is preferably formed from a gas-impermeable material such as silicon rubber and operates to provide a sealed environment above the array of reaction wells 18. Gasket 24 preferably has a perimeter edge 25 which forms a gas-tight seal around the outer perimeter of support rack 16. Specifically, edge 25 projects downwardly such that sufficient space is provided to accommodate gas distribution plate 22 and reaction caps 20, as seen in FIGS. 3A and 3B.

Top plate 26 is preferably formed from anodized aluminum and is fastened into position by being pressed tightly downward upon gasket 24 such that retaining clips 28 matingly interlock with notches 21 in support rack 16. Pressing top plate 26 tightly down upon gasket 24 to assemble the device causes gasket 24 to be compressed. Thus, upon removal of a sample delivering injection needle passing therethrough, compressed gasket 24 will self-seal so as to close around the hole which had been formed by the injection needle. Holes 27 in top cover 26 permit easy access of injection needles therethrough when delivering samples into reaction wells 18.

A gas port 40 is provided to enable gases to be selectively introduced and/or evacuated from the sealed environment above the array of reaction wells 18 as follows. Gas introduced through gas port 40 passes through the porous gas distribution plate 22 at region 22a adjacent gas port 40. Accordingly, gas introduced through gas port 40 will diffuse through region 22a of plate 22, thereby being introduced into reaction well 18a. Similarly, the gas is able to pass between reaction wells 18a and 18b by passing through region 22b of gas plate 22. As can be appreciated, gases can therefore be variously introduced and/or removed from above the entire array of reaction wells 18 by way of gas port 40. Due to the high resistance to liquid permeation through gas distribution plate 22, an additional advantage of gas distribution plate 22 is that it prevents any cross-contamination of liquids between any two adjacent wells.

Preferably, a similar gas port would be positioned at the opposite end of the device from that shown in the partial view of FIG. 3 such that gas could easily be introduced into a gas port at one end and simultaneously withdrawn from the gas port at the other opposite end of the device. An additional gas port or ports 43 (seen in FIG. 1A) can be provided. In operation, gas port 40 would typically be connected to a pneumatic manifold for introducing and removing gasses as desired.

Optional reactor caps 20 provide a convenient device for effectively sealing the liquid samples within the various reaction wells 18, yet permitting gas to be introduced or removed easily due to the geometry of the reactor caps. Specifically, the introduction of a liquid sample into a reaction well 18 substantially remains within the well for various orientations of the device.

Central vent 38 of reactor cap 20 permits the addition or removal of material to reaction well 18 without requiring that reactor cap 20 be removed. Consequently, an important advantage of the present invention is that when mixing the contents of the array of reaction wells, such as with vibrational shaker equipment, it is not necessary to individually seal the top ends of the reaction wells 18 during this process. As such, a user can synthesize compounds and then shake or otherwise mix the compounds without a substantial loss of the compounds out of open top end 30 of the reaction wells.

Figure 4:
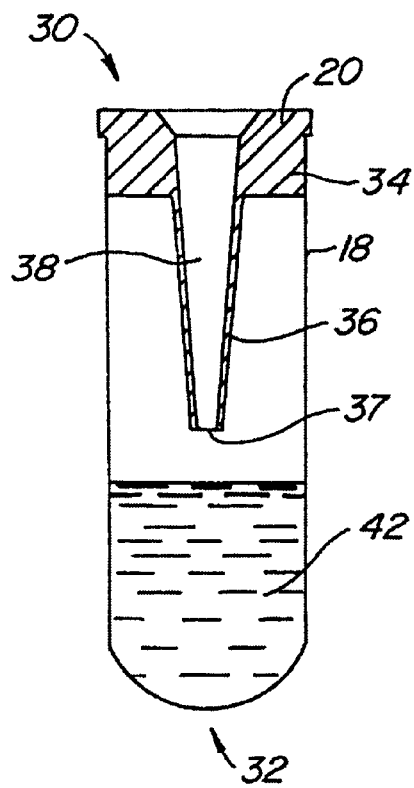
FIG. 4 is sectional side elevation view of a single prior art reaction well in an upright orientation, as incorporated into the present novel device of FIGS. 3A and 3B.
Figure 5:
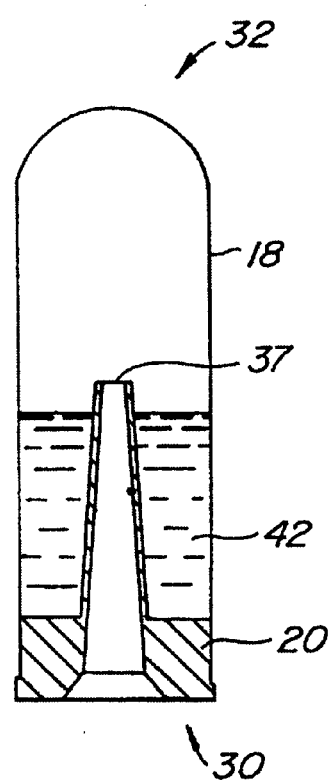
FIG. 5 shows the reaction well of FIG. 4 in an inverted position.
Figure 6:
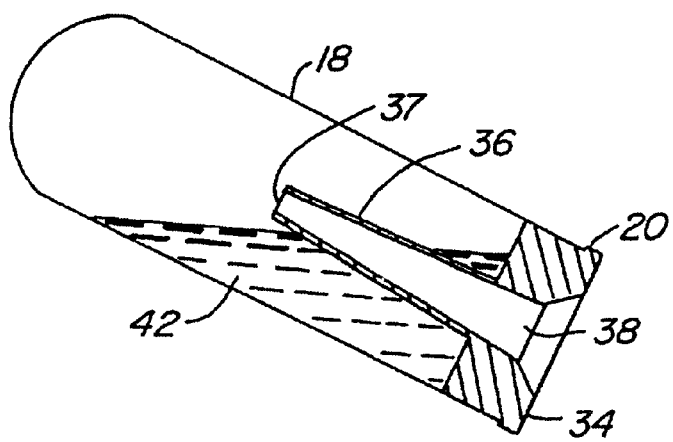
FIG. 6 shows the reaction well of FIG. 4 in a partially inverted position.
Figure 7:
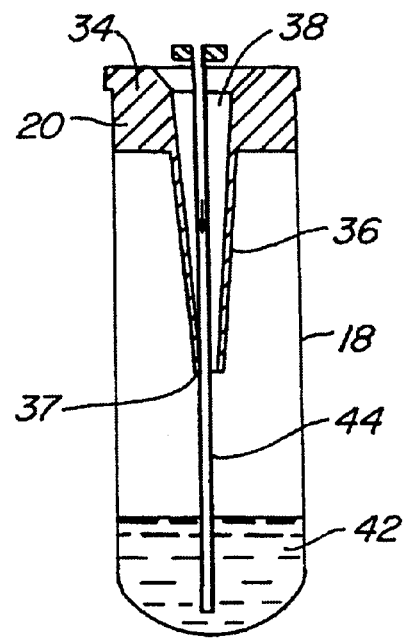
FIG. 7 shows an injection needle received into the reaction well of FIG. 4.

FIG. 4 shows an upright orientation of a single reaction well 18 containing a liquid 42. As can be seen, liquid 42 will pool at the bottom end 32 of reaction well 18. Funnel portion 36 has a narrow open end 37 which operates to hold liquid samples within reaction wells 18 for all orientations of the reaction well. FIG. 5 shows an inverted orientation of reaction well 18. In this orientation, liquid 42 pools at top end 30 with narrow end 37 of funnel portion 36 positioned at a location above the liquid as shown. Accordingly, inverting reaction well 18 as shown will not permit the liquid 42 to escape from the reaction well. FIG. 6 shows a semi-inverted orientation of reaction well 18. In this orientation, the narrow open end 37 of funnel portion 36 still remains above liquid 42. Accordingly, as can be appreciated when viewing FIGS. 4, 5 and 6 together, liquid 42 does not flow out of reaction well 18 as well 18 is rotated from an upright position to an inverted position. Moreover, narrow open end 37 is preferably dimensioned to be of a small enough diameter such that the viscosity and surface tension of the liquid will tend to prevent the liquid from exiting through narrow end 37. FIG. 7 illustrates a convenient needle guide for directing an injection needle 44 to the central bottom region of reaction well 18, thereby enhancing mixing by penetrating to the deepest portion of the reaction wells as fluid samples are added by needle 44.

Figure 8:
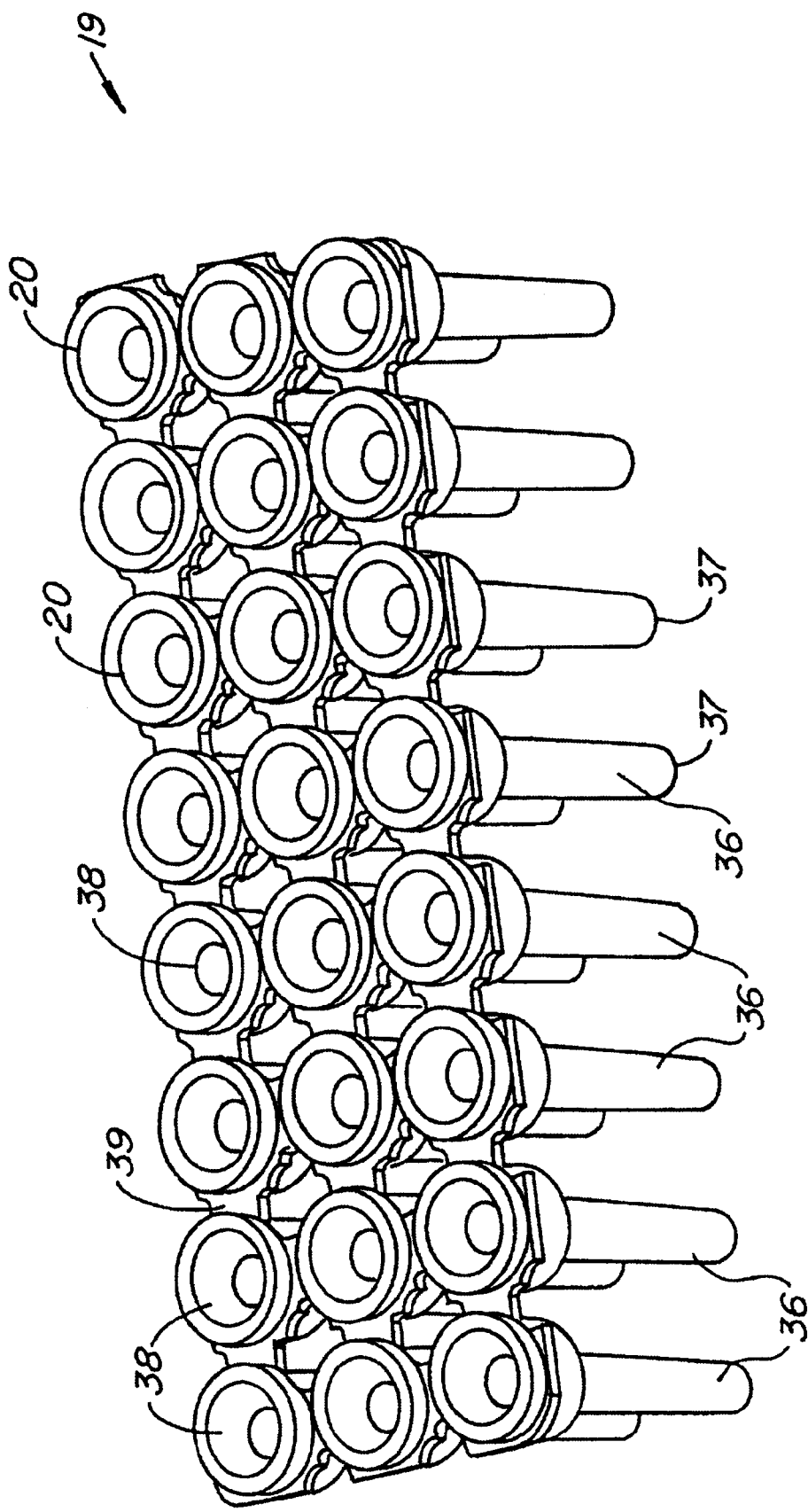
FIG. 8 is a top perspective view of prior art reaction caps as incorporated into the novel device of FIGS. 1A, 1B, 3A and 3B.
Figure 9:
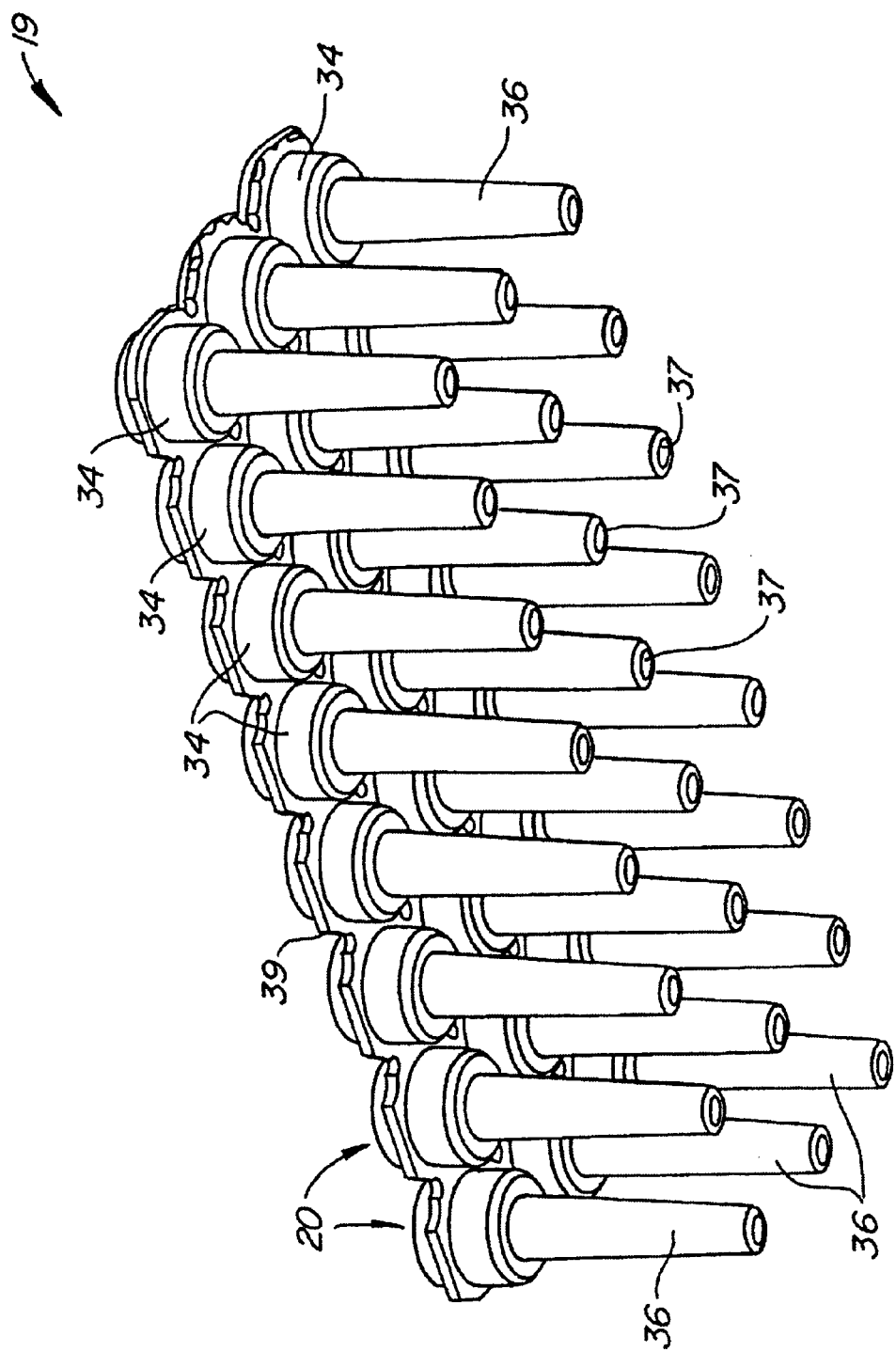
FIG. 9 is a bottom perspective view of the reaction caps of FIG. 8.

Referring to FIGS. 8 and 9, further structural details of optional reactor cap assembly 19 is seen. For example, reactor caps 20 are preferably held together by a interlocking web 39. Accordingly, the array of reactor caps 20 of assembly 19 can be easily and simultaneously inserted into the array of reaction wells 18. As such, web 39 will preferably be formed from polypropylene or polyethylene which will flex to allow for easy positioning. Preferably, for ease of manufacturing, optional reactor cap assembly 19 is integrally formed from a single piece of suitable material which may comprise polypropylene.

Figure 10:
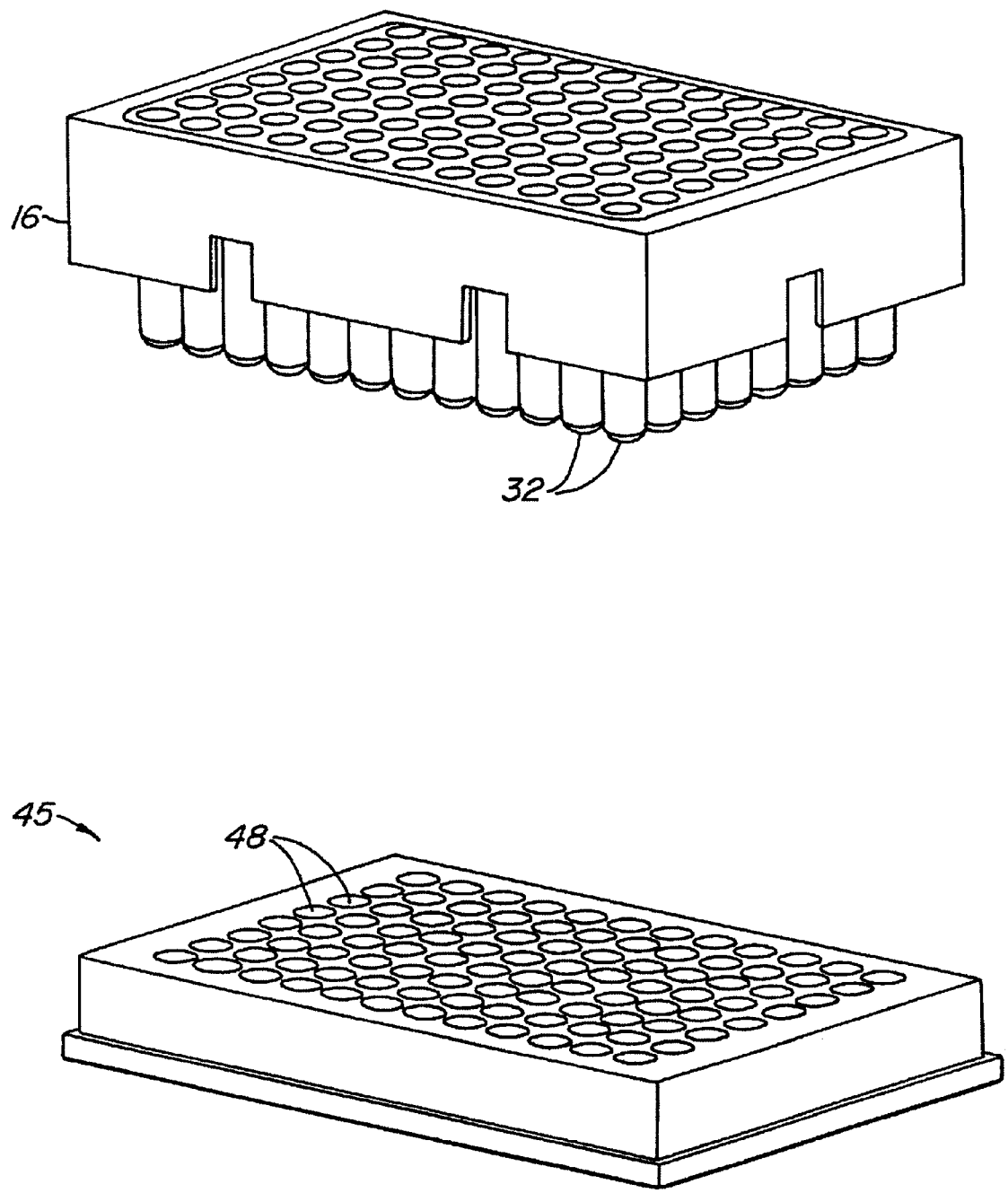
FIG. 10 is a top perspective view of a removable base plate which is adapted to be positioned under and support the closed bottom ends of the reaction wells of the device of FIG. 2.

As can be seen in FIG. 10, the present multi-well microtitre reaction system 15 can be mounted to and supported by an optional base plate 45 which has holes 48 sized and positioned to receive closed bottoms 32 of reaction wells 18 in a nested relationship therein. When received in such a temporary nested relationship in base plate 45, system 15 may conveniently be held in place by way of press fitting wells 18 into holes 48. However, the attachment of base plate 45 permits system 15 to instead be conveniently mounted to any device which operates in conjunction with standard deep well microtitre plate format including centrifuges, orbital shakers, shelf dryers, analytical injectors and liquid handling robots.

Figure 11A:
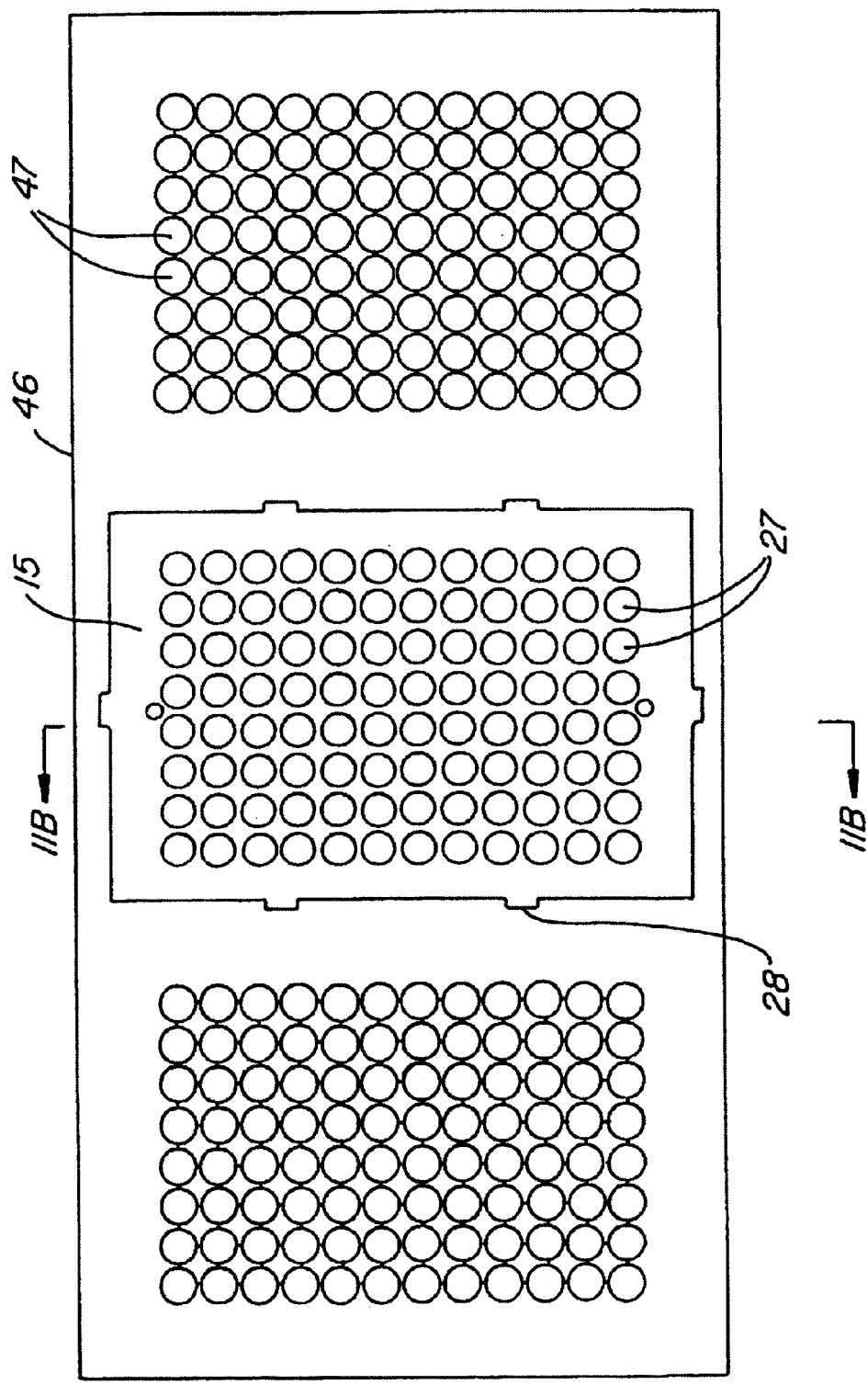
FIG. 11A is a top plan view of one of the devices of FIG. 2 received into a temperature heating and cooling block.
Figure 11B:
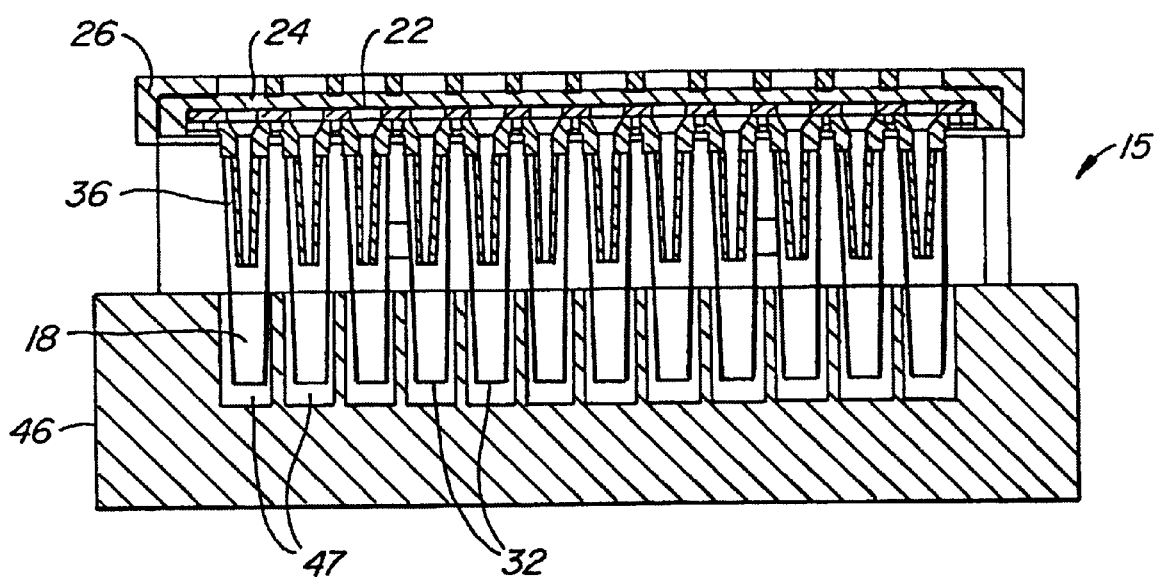
FIG. 11B is a sectional elevation view along line 11B—11B in FIG. 11A.
Figure 12:
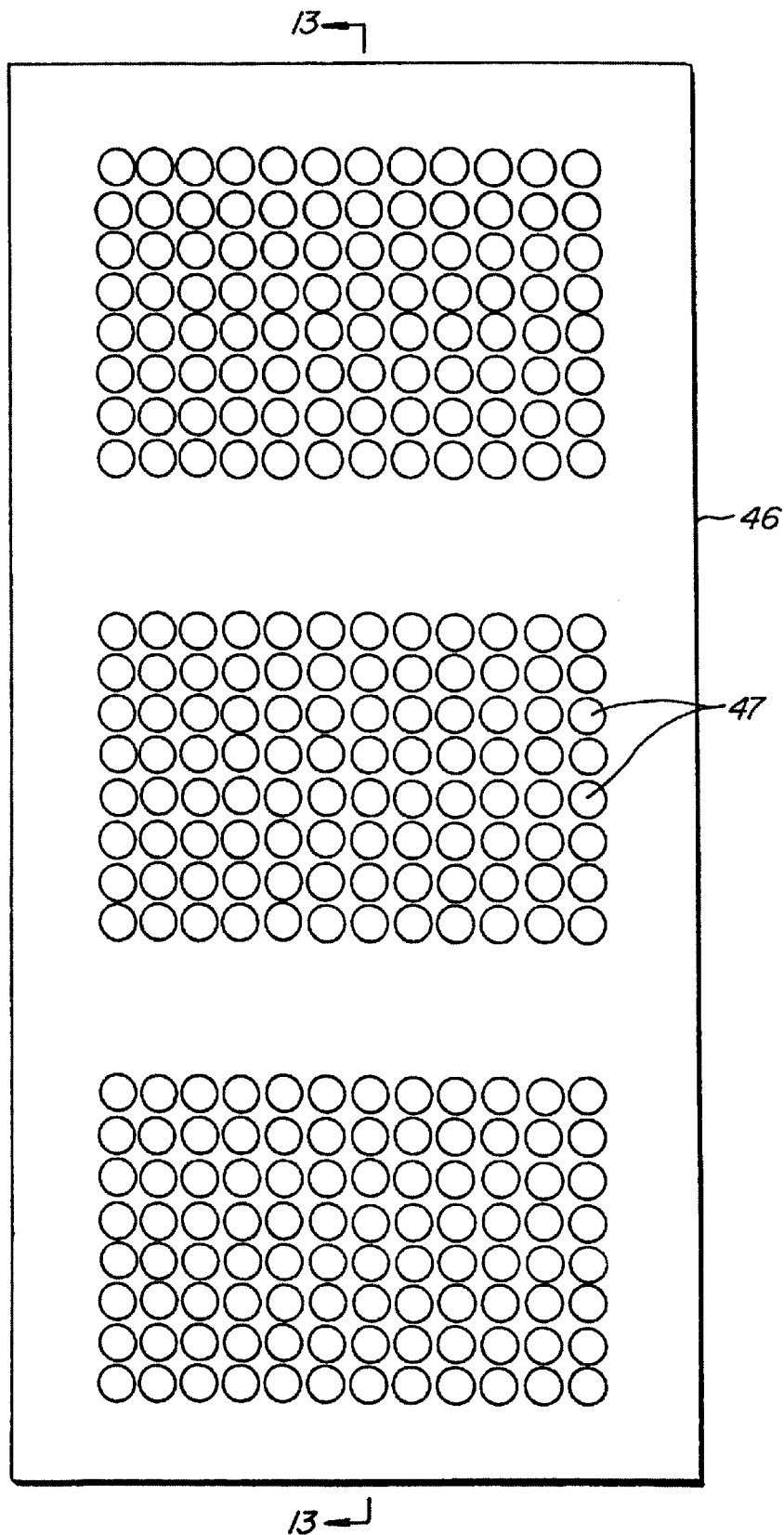
FIG. 12 is a top plan view of the temperature heating and cooling block of FIG. 11A.

As can be seen in FIGS. 11a, 11b, 12 and 13, an optional temperature heating and cooling block 46 can also be provided. As can be seen in FIGS. 11a, 11b and 12, block 46 can be dimensioned to accommodate a plurality of separate microtitre reaction systems 15 therein. In this particular example, block 46 is shown dimensioned to hold three microtitre systems. It is to be understood, however, that block 46 could instead be dimensioned to accommodate any number of microtitre reaction systems, including only a single microtitre reaction system. Block 46 has one or more arrays of holes 47 which are dimensioned to mate with lower closed ends 32 of reaction wells 18 of system 15, thereby holding wells 18 in a nested relationship therein. Block 46 can preferably be formed of aluminum.

Figure 13:
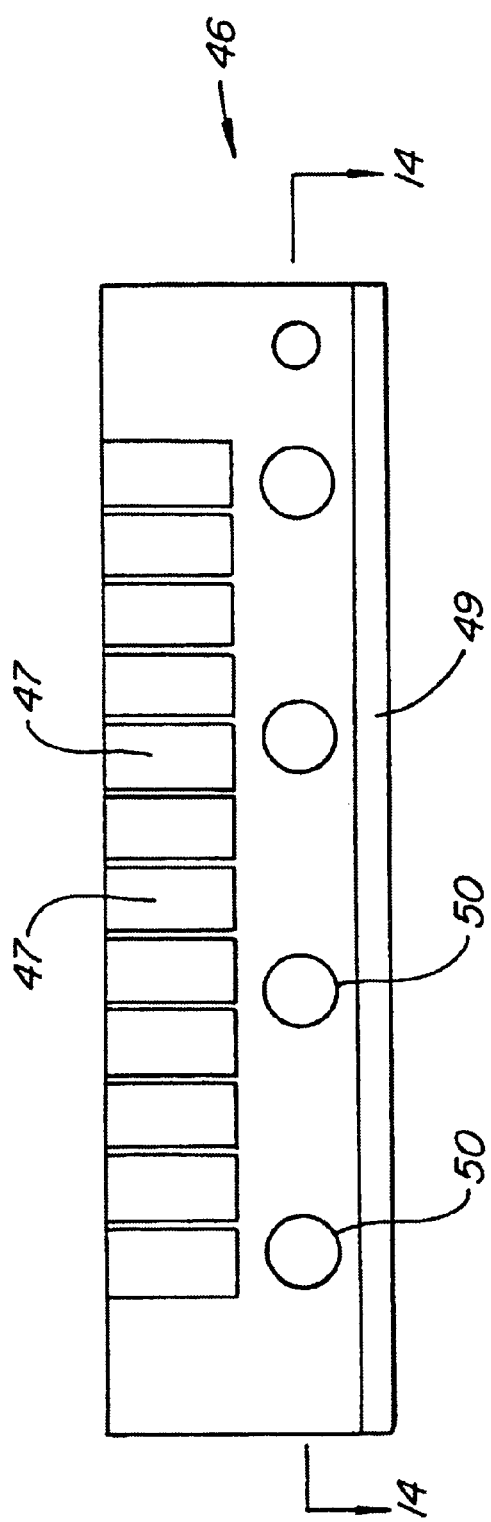
FIG. 13 is a side sectional elevation view of the block of FIG. 12, taken along line 13—13 of FIG. 12.

As is also seen in FIG. 13, a thermocouple controlled heating element 49 may also be provided. Preferably, heating element 49 spans across the entire bottom of block 46. The application of a current across heating element 49 operates to generate heat which is then radiated upwardly into the various reaction wells 18 when wells 18 are received downwardly into holes 47. Controllably varying the amount of current passing through heating element 49 operates to control the degree of heating provided to the reaction wells.

Figure 14:
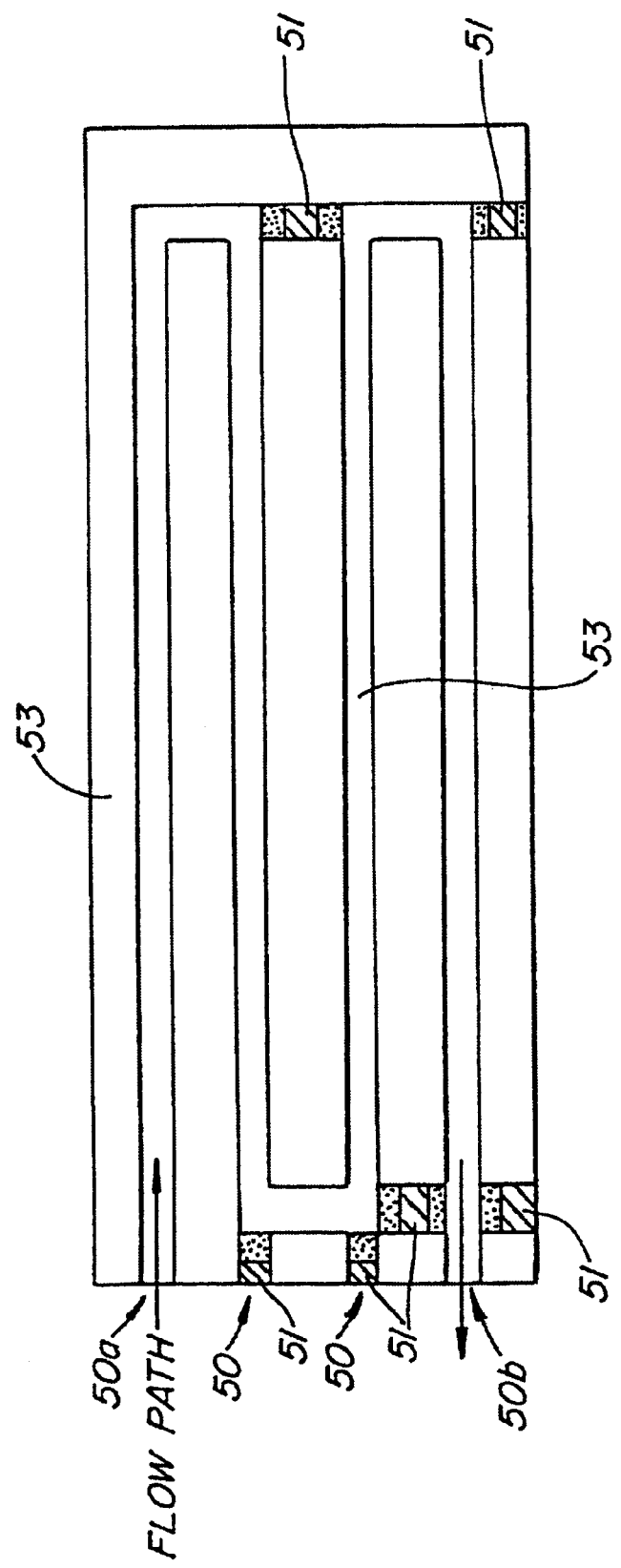
FIG. 14 sectional top plan view of the block of FIG. 12, taken along line 14—14 of FIG. 13.

As can be seen in FIG. 14, block 46 preferably also includes a plurality of interior channels 53 passing therethrough with a plurality of side portals 50 cut therein. Portals 50 permit fluid to flow through block 46. Preferably, this fluid is a cooling fluid which is used to lower the temperature in reaction wells 18 when the wells are received in holes 47 of block 46. It is to be understood that channels 53 may be disposed within block 46 in any number of geometric orientations. For uniform cooling however, channels 53 will preferably be disposed in block 46 in an orientation such that each individual reaction well 18 will be spaced generally proximal an underlying channel 53.

Plugs 51 are preferably formed from the same material as block 46 and can selectively be positioned in channels 53 such that fluid flow path through block 46 can be directed in a preferred path. As shown in FIG. 14, this preferred path can be of a serpentine nature. An advantage of such a serpentine flow is that improved heat exchange will occur between the reaction wells and the cooling fluid, due to the increased time taken for the fluid to pass through block 46, as compared to the instance where plugs 51 are removed. Moreover, fluid tubing connections to block 46 are simplified by plugs 51 installed as shown as fluid need only be introduced through a single portal 50a and exit at another single portal 50b.

By controlling the temperature, flow path and flow rate of cooling fluid passing through block 46, or by controlling the amount of current passing through heating element 49, the heating and cooling effects on the reaction wells can be controllably balanced permitting a desired temperature to be quickly reached and adjusted as required.

Modification and variation can be made to the disclosed embodiments without departing from the subject of the invention as defined in the following claims. For example, the materials added to the various reaction wells can be either a liquid, gas or a solid such as pellets or powder. Moreover, any temperature of fluid can be used in block 46 to provide temperature control. For example, a heating fluid may be used instead of a cooling fluid, thereby reducing or eliminating the need for heating with heating element 49.

What is claimed is:

1. A microtitre reaction system, comprising,
   a support rack having an array of reaction wells disposed therein, each reaction well having an open top end and a closed bottom end;
   a gas-permeable layer positioned over the support rack, the gas-permeable layer having an array of holes therein with each hole being positioned over the open top end of each of the plurality of reaction wells, the gas permeable layer permitting gas movement between adjacent reaction wells, but preventing liquid movement between adjacent reaction wells; and
   a self-sealing gasket positioned over the gas-permeable layer and the open top ends of the array of reaction wells.

2. The microtitre reaction system of claim 1, further comprising:
   a base plate dimensioned to be positioned under the support rack, the base plate having an array of receiving holes dimensioned to support the bottom ends of the reaction wells in a nested relationship therein.

3. The microtitre reaction system of claim 1, wherein, an outer edge of the gasket contacts an outer edge of the support rack, thereby enclosing the interior volumes of the plurality of reaction wells in a sealed environment.

4. The microtitre reaction system of claim 3, further comprising,
   a gas entry port liquidly coupled to the gas-permeable layer permitting gas exchange between the gas-permeable layer and an external environment.

5. The microtitre reaction system of claim 1, further comprising:
   a top cover positioned over the gasket.

6. The microtitre reaction system of claim 5, wherein, the top cover further comprises a plurality of retaining clips extending downwardly to matingly interlock with the support rack.

7. The microtitre reaction system of claim 5, wherein, the top cover is formed from anodized aluminum.

8. The microtitre reaction system of claim 1, further comprising,
   a temperature heating and cooling block dimensioned to be positioned under the support rack, the block having an array of holes dimensioned to support the bottom ends of the reaction wells in a nested relationship therein.

9. The microtitre reaction system of claim 8, further comprising,
   a thermocouple controlled heating element.

10. The microtitre reaction system of claim 8, further comprising,
    a plurality of interior channels passing through the block.

11. The microtitre reaction system of claim 10, wherein, the plurality of interior channels form a serpentine flow path.

12. The microtitre reaction system of claim 1, further comprising:
    a plurality of generally funnel shaped reactor caps with each of the reactor caps being received into the open top end of each of the reaction wells.

13. The microtitre reaction system of claim 12, wherein, the reactor cap comprises a sealing plug portion and an open-ended funnel cone portion.

14. The microtitre reaction system of claim 12, wherein, the plurality of reaction caps are held together in an array formation by an interlocking web.

15. The microtitre reaction system of claim 14, wherein, the plurality of reaction caps and the interlocking web are integrally formed from a single piece of material.

16. The microtitre reaction system of claim 1, wherein, the support rack has an array of passages passing therethrough; and
    each of the reaction wells comprise an individually removable reaction well received into one of the passages of the support rack.

17. The microtitre reaction system of claim 16, wherein, the reaction well is tightly received into the passage, thereby sealing the passage.

18. The microtitre reaction system of claim 1, wherein, the support rack is formed from polypropylene.

19. The microtitre reaction system of claim 1, wherein, the reaction wells are formed from polypropylene.

20. The microtitre reaction system of claim 1, wherein, the reaction wells are formed from glass.

21. The microtitre reaction system of claim 1, wherein, the gas-permeable layer is formed from polypropylene.

22. The microtitre reaction system of claim 1, wherein, the gasket is formed from silicone rubber.

23. A microtitre reaction system, comprising,
    a support rack having an array of passages passing therethrough;
    an array of individually removable reaction wells disposed in the passages, each reaction well having an open top end and a closed bottom end;
    a plurality of generally funnel shaped reactor caps with each of the reactor caps being received into the open top end of each of the reaction wells;

a gas-permeable layer positioned over the support rack, the gas-permeable layer having an array of holes therein with each hole being positioned over the open top end of each of the plurality of reaction wells, the gas permeable layer permitting gas movement between adjacent reaction wells, but preventing liquid movement between adjacent reaction wells;

a self-sealing gasket positioned over the gas-permeable layer and the open top ends of the array of reaction wells, an outer edge of the gasket contacting an outer edge of the support rack, thereby enclosing the interior volumes of the plurality of reaction wells in a sealed environment;

a top cover positioned over the gasket; and a plurality of retaining clips extending downwardly to matingly interlock with the support rack.

* * * * *